US006889571B2

(12) United States Patent
Kalsi et al.

(10) Patent No.: US 6,889,571 B2
(45) Date of Patent: May 10, 2005

(54) ACTUATOR

(75) Inventors: Gurbinder Singh Kalsi, West Midlands (GB); Douglas Conquest, Norfolk (GB)

(73) Assignee: Meritor Light Vehicle Systems (UK) Limited (GB)

(*) Notice: Subject to any disclaimer, the term of this patent is extended or adjusted under 35 U.S.C. 154(b) by 227 days.

(21) Appl. No.: 09/921,439

(22) Filed: Aug. 2, 2001

(65) Prior Publication Data

US 2002/0059843 A1 May 23, 2002

(30) Foreign Application Priority Data

Aug. 4, 2000 (GB) .......................................... 0019017

(51) Int. Cl.[7] .......................... F16H 57/00; E05B 47/00

(52) U.S. Cl. .......................... 74/405; 74/425; 292/201; 70/264

(58) Field of Search ..................... 74/405, 425, 479.01, 74/480 R, 490.11; 70/264, 237; 192/69.62; 292/201

(56) References Cited

U.S. PATENT DOCUMENTS 3,768,325 A * 10/1973 Kucharski, Jr. .............. 74/405
4,518,181 A 5/1985 Yamada
4,573,723 A 3/1986 Morita et al.
4,597,480 A * 7/1986 Schwarz .................. 192/56.61
4,664,430 A * 5/1987 Bernard ...................... 292/201
4,706,512 A * 11/1987 McKernon et al. ........... 74/405
4,739,677 A * 4/1988 Kofink et al. ................. 74/625
4,779,912 A * 10/1988 Ikeda et al. .............. 292/336.3
4,793,640 A 12/1988 Stewart, Sr.
4,876,909 A 10/1989 Andrei-Alexandru et al.
4,926,707 A 5/1990 Yamada
4,966,266 A 10/1990 Yamada et al.
5,106,133 A * 4/1992 Fukumoto et al. .......... 292/201
5,453,671 A 9/1995 Baier et al.
5,649,726 A * 7/1997 Rogers, Jr. et al. ......... 292/201
5,697,237 A 12/1997 Dilger et al.

FOREIGN PATENT DOCUMENTS

| | | | |
|---|---|---|---|
| DE | 4 404 778 | C | 7/1995 |
| DE | 1 991 3666 | A | 9/2000 |
| EP | 0 684 356 | A1 | 11/1995 |
| GB | 2 210 118 | A | 6/1989 |
| GB | 2 330 620 | A | 4/1999 |
| JP | 0 102 50582 | A | 10/1989 |

OTHER PUBLICATIONS

Search Report Under Section 17 dated Nov. 29, 2000 searching claims 1–5.

Search Report Under Section 17 dated Jun. 26, 2001 searching claims 6–10.

Search Report Under Section 17 dated Nov. 29, 2000 searching claim 11.

European Search report, dated Mar. 5, 2003.

* cited by examiner

*Primary Examiner*—David A. Bucci
*Assistant Examiner*—Timothy McAnulty
(74) *Attorney, Agent, or Firm*—Carlson, Gaskey & Olds

(57) ABSTRACT

An actuator including a rotatable gear wheel reversibly drivable by a motor, the gear wheel being operably connectable to an output element by a drive transfer device, the output element being moveable between a first and second position, in which the drive transfer device is operably disconnectable from the output lever to allow independent movement of the output lever.

25 Claims, 4 Drawing Sheets

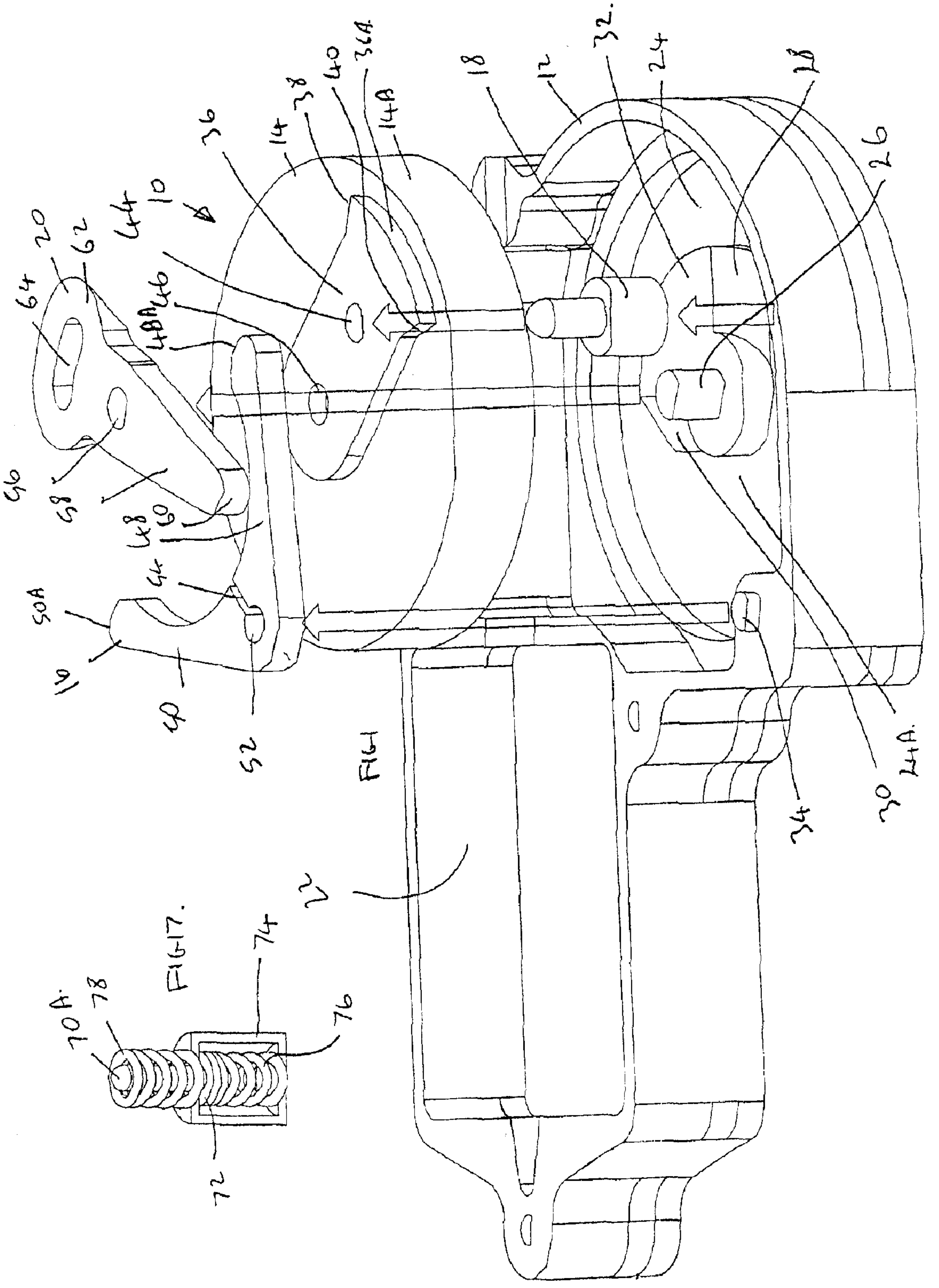

RAMP

A
B

ACTUATOR

BACKGROUND OF THE INVENTION

The present invention relates to actuators, in particular power actuators for operating lock mechanisms of vehicle doors and other closures.

Such power operated lock mechanisms commonly form part of a central locking system of the vehicle whereby locking or unlocking of some or all doors or other closures can be effected from a single control station actuated from within or outside the vehicle as by a coded infra red or other remote input device. The lock mechanism and associated power actuator will provide for manual operation whereby respective doors can be locked and unlocked using a conventional internal sill button or other manually operated input element, and, maybe by manual operation of a cylinder or key controlled exterior lock.

SUMMARY OF THE INVENTION

An object of the present invention is to provide an improved form of actuator.

Thus according to the present invention there is provided an actuator including a rotatable worm wheel reversibly drivable by a motor, the worm wheel being operably connectable to an output element by a drive transfer device, the output element being moveable between a first and second position, in which the drive transfer device is operably disconnectable from the output lever to allow independent movement of the output lever.

According to another aspect of the present invention there is provided an actuator including a gear wheel being rotatable relative to a chassis of the actuator and being reversibly drivable by a motor, the gear wheel being operably connectable to an output element by a drive transfer device, the output element being moveable between a first and second position, the output element acting to move a stop device between a corresponding first and second position, in which the stop device acts to stop the motor.

According to another aspect of the present invention there is provided an actuator including a rotatable gear wheel reversibly drivable by a motor, the gear wheel being operably connectable to an output element by a drive transfer device, the output element being moveable between a first and second position, in which a stop device operates on forwards and reverse gear wheel stop to stop the motor, in a forwards and reverse direction, the stop device including a forwards stop device stop resiliently moveable relative to a reverse stop device stop to allow the forwards gear wheel stop to pass the reverse stop device stop and to allow the reverse gear wheel stop to pass the forwards stop device stop.

BRIEF DESCRIPTION OF THE DRAWINGS

The invention will now be described, by way of example only with reference to the accompanying drawings in which:

FIG. 1 an exploded isometric view of part of an actuator according to the present invention;

FIG. 17 shows this drive transfer device of FIG. 1.

DETAILED DESCRIPTION OF THE DRAWINGS

Figures 2, 3, 4, 5, 13, 14:
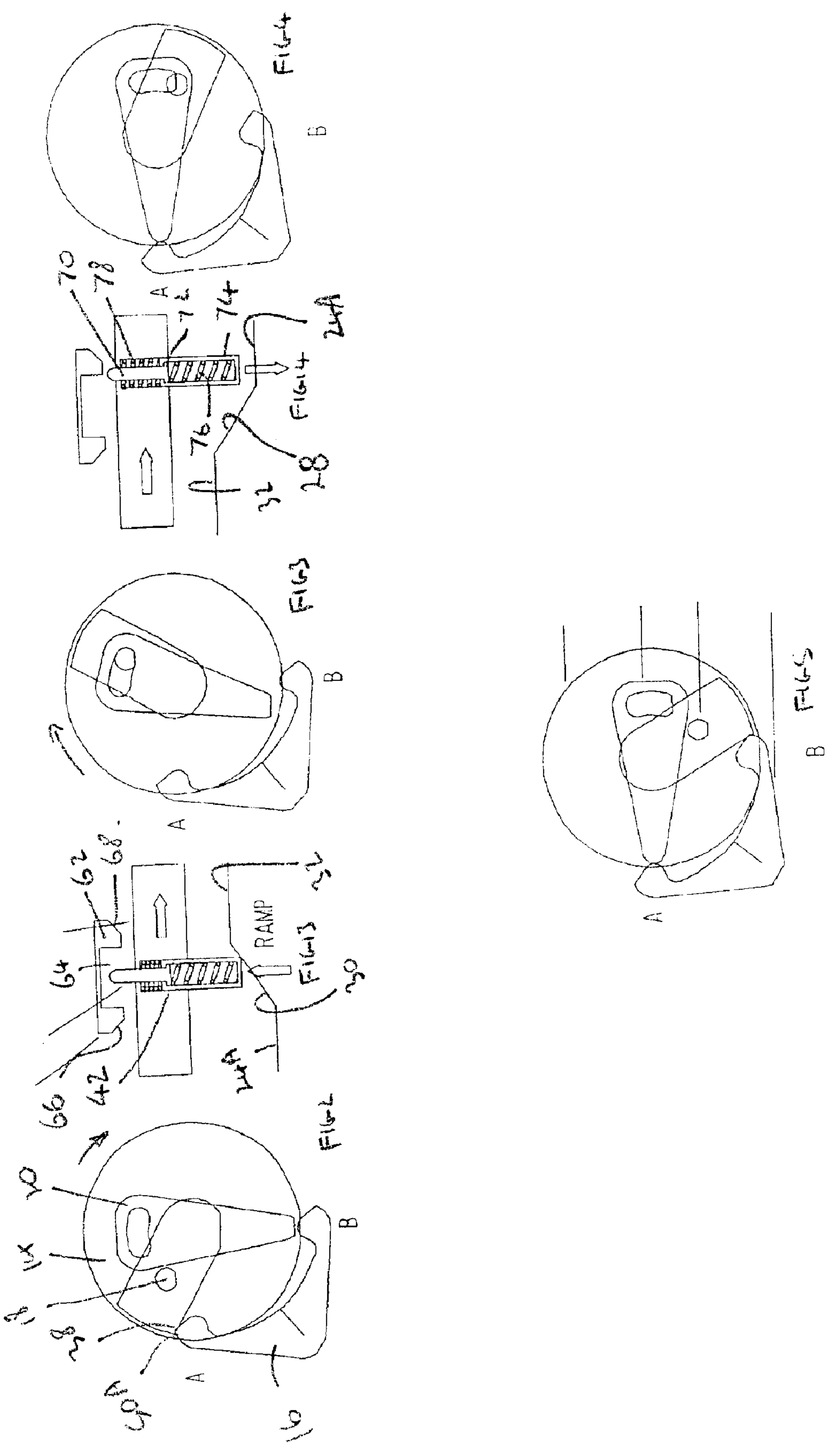
FIGS. 2 to 12 are partial plan views of the actuator of FIG. 1.
FIGS. 13 to 15 are partial side elevation views of the actuator FIG. 1.

With reference to FIG. 1 there is shown an actuator 10 having a housing 12, a gear wheel, in this case a worm wheel 14, a stop device 16, a drive transfer device 18 and an output element 20.

Actuator 10 further includes a motor (not shown) having an output shaft (not shown) upon which is mounted a pinion (not shown) for engagement with the periphery 14A of the worm wheel 14.

Housing 12 includes a motor recess 22 in which sits the motor, and a worm wheel recess 24 in which sits the worm wheel 14.

Within the worm wheel recess is a first pivot pin 26. Furthermore the worm wheel recess includes first ramp 28 and second ramp 30 which are connected by plateau 32.

Housing 12 further includes a second pivot pin 34.

Worm wheel 14 includes a tooth periphery 14*a* (teeth of which are not shown for clarity).

Worm wheel further includes boss 36 having abutments 38 and 40 (also known as reverse gear wheel stop and forwards gear wheel stop).

A recess 42 is provided in a lower portion of the worm wheel and a hole 44 provides communication between the upper surface of the boss 36 and the recess 42.

The worm wheel further includes a central hole 46 in which is the positioned first pivot pin 26 to allow the worm wheel to rotate within the worm wheel recess 24.

Stop device 16 includes first arm 48 and second arm 50.

A forwards stop abutment 48A (also known as a forwards stop device stop) is provided on the end of first arm 48 and a reverse stop abutment 50A (also known as a reverse stop device stop) is provided on the end of second arm 50.

Stop device 16 includes a hole 52 for mounting on second pivot pin 34 to allow the stop device to pivot about second pivot pin 34.

A slot 54 is provided between the first and second arms and runs from the hole 52 in the general direction of the first pivot pin 26.

Figure 6:
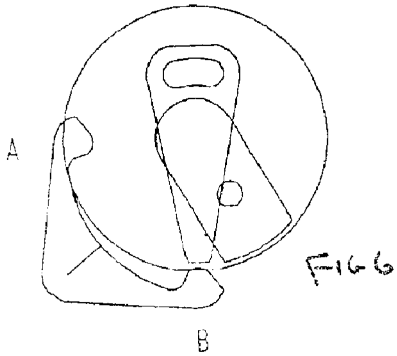

The stop device 16 is made from a resilient material and the slot 54 allows the forward stop abutment 48A to move slightly relative to reverse stop abutment 50A (see especially FIG. 7) wherein the slot 54 has opened slightly when compared with say FIG. 6.

The output element 20 includes a central hole 56 for pivotally mounting the output element on the first pivot pin 26.

The output element 20 further includes a first arm 58 which terminates in abutment 60 and a second arm 62 which includes a recess 64 and first and second ramps 66 and 68.

Figure 15:
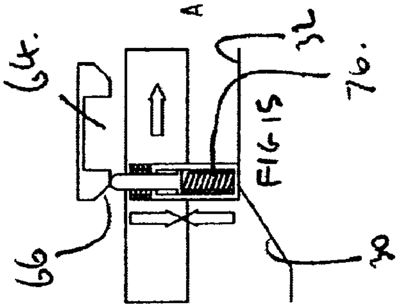

The drive transfer device 18 (shown schematically in FIG. 1, though in more detail in FIG. 17) includes a pin 70 having a lower shoulder 72 contained within pin housing 74. The drive transfer device 18 further includes a first spring 76 also contained within pin housing 74 and a second spring 78 mounted around the pin and within recess 42. It can be seen that the second spring 78 acts on pin housing 74 which in turn acts on shoulder 72 to bias the pin 70 downwards (when viewing FIG. 14) relative to the worm wheel. Furthermore the first spring 76 acts on a lower portion of the pin housing to bias the pin 70 upwards towards the output element 20 (see especially FIG. 15).

Operation of the actuator is as follows.

Consideration of FIG. 2 shows that the output element 20 at position B whilst abutment 38 of the worm wheel rest upon reverse stop abutment 50A of the stop device 16. In this position the drive transfer device 18 is aligned with recess base 24A thus allowing both the first spring 76 and second spring 78 to become extended (see for example FIG. 14). As such pin head 70A sits below the output element 20.

Actuation of the motor causes the worm wheel to move in a forwards (clockwise) direction when viewing FIG. 2, progressively through the position shown in FIG. 13, FIG. 3, FIG. 14, FIG. 4 to the position shown in FIG. 5.

It should be noted that the forwards and reverse directions of the motor have been chosen arbitrarily simply for ease of understanding of the invention.

Consideration of FIG. 13 shows that the worm wheel has rotated, carrying with it the drive transfer device, such that the pin housing 74 is caused to ride up second ramp 30 which results in second spring 78 becoming compressed and pin head 70 entering recess 64 of the output element 20.

It should be noted that the drive transfer device is moved at a predetermined position of the worm wheel relative to the chassis of the actuator, i.e. when the drive transfer device engages the ramp. Furthermore, during this powered operation only second spring 78 is compressed and thus the drive transfer device acts in a first resilient mode.

Consideration of FIG. 3 shows that pin 70A has contacted an edge of recess 64 resulting in the drive transfer device 18 transferring the rotational movement of the worm wheel 14 to the output element 20. Note that output element 20 has moved in a clockwise direction from position B.

During this movement a lower edge of the pin housing 74 slides along plateau 32 thus ensuring that pinhead 70A is maintained in recess 64.

Consideration of FIGS. 14 and 4 show different views of the actuator in the same position. It should be noted that pin housing has moved from plateau 32 down first ramp 28 and is opposite recess base 24*a*. This allows first spring 76 to extend thus lowering pin head 70A from within recess 64 and disengaging drive between the worm wheel and the output element. The first ramp 28 is arranged such that the output element 20 is rotated to position A, but no further. In this position abutment 60 of output element 20 has contacted the end of second arm 50 of the stop device causing it to rotate slightly in an anticlockwise direction (compare FIG. 2 and FIG. 4).

Continued operation of the motor causes the worm wheel alone to rotate to the position as shown in FIG. 5 whereupon abutment 40 contacts forward stop abutment 48A which stops the motor by causing it to stall momentarily until the power to the motor is stopped. Note that forwards stop abutment 48A acts as a substantially rigid stop since arm 48 does not compress. However, in further embodiments it would be possible to put in a degree of resilience to the system such that the gear wheel is stopped progressively.

By driving the motor in a reverse direction the worm wheel 14, stop device 16, drive transfer device 18 and output element 20 can be returned to the position as shown in FIG. 2.

However, starting at the position shown in FIG. 5, it is also possible to manually move the output element 20 anticlockwise from position A as shown in FIG. 5 to position B as shown in FIG. 6, since at no time during this movement does pin head 70A engage recess 64.

Where power operation is required to move the output element 20 from position B to position A, the motor is actuated to drive the worm wheel in the clockwise direction.

Figure 7:
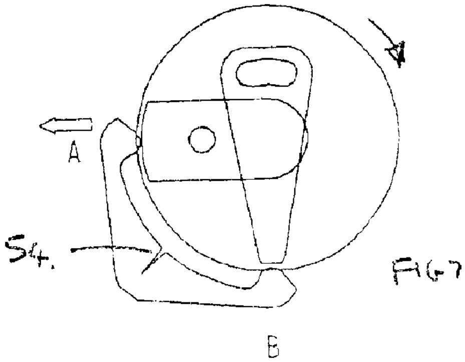

In particular consideration of such powered movement from position shown in FIG. 6 to the position shown in FIG. 7 shows that during this time the drive transfer device is always opposite recess base 24A and hence pin head 70A is in a lowered position and can pass under first arm 58 of output element 20.

Continued clockwise movement of the worm wheel causes abutment 40 (forwards gear wheel stop) and the radially outer edge 36*a* to move past the end of second arm 50 and in particular past reverse stop abutment 50A, causing the second arm 50 to spring radially outwards in doing so. Note that as shown in FIG. 7 the end of first arm 48 cannot move radially inwards since it is prevented from doing so by abutment 60 of the output element 20.

Figure 8:
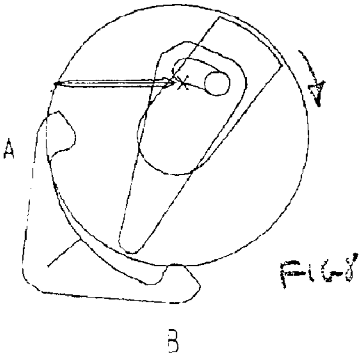
Figure 9:
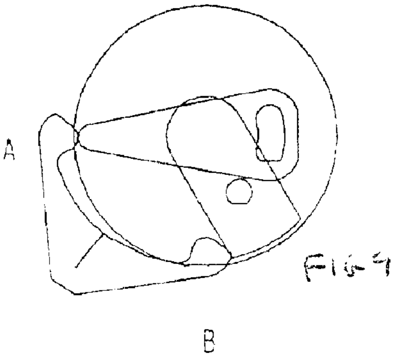

Continued clockwise movement of the worm wheel through the position shown in FIG. 8 to the position shown in FIG. 9 moves the output element to position A. Note that the position shown in FIG. 8 is identical to the position shown in FIG. 3 and the position shown in FIG. 9 is identical to the position shown in FIG. 5.

Consideration of the sequence of FIGS. 5–9 shows that the worm wheel has only been driven in a clockwise direction (FIGS. 7, 8, and 9) but that the output element is manually moved from the position shown in FIG. 5 to the position shown in FIG. 6. Thus by alternate manual and power operation it can be seen that the worm wheel only rotates in one direction and in particular the worm wheel rotates through 360° for every manual/powered sequence as shown in FIGS. 5–9. Thus, if required, the worm wheel can be operated in such a manner that it continually rotates in the same direction.

Figure 10:
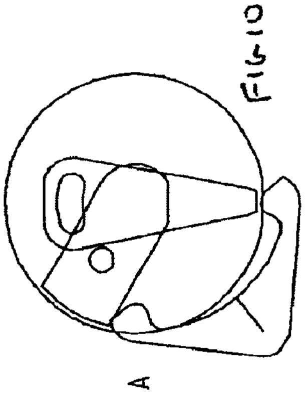

Consideration of FIG. 10 shows the output element 20 in position B (in fact the position shown in FIG. 10 is identical to the position shown in FIG. 2).

Figure 11:
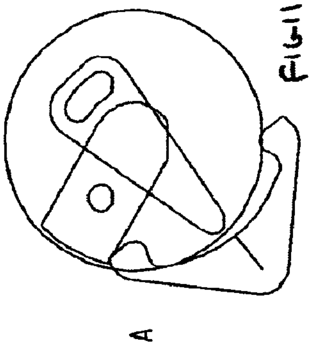

Whilst it is possible to manually move the output element 20 from position B to position A as described above it is also possible to move the output element 22 to a position intermediate position A and B (see FIG. 11).

Figure 12:
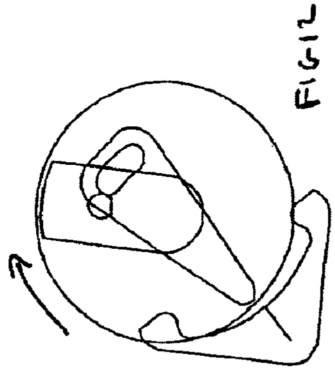

Subsequent powered operation of the worm wheel in a forward direction (clockwise when viewing FIG. 12) causes the pin housing 74 to ride up second ramp 30 resulting in pin head 70A progressively projecting from the top surface from boss 36.

However, because the output element 20 has been moved to an intermediate position pin head 70A rises outside recess 64. However, continued rotation of the worm wheel causes pin head 70A to engage first ramp 66 which results in a camming action forcing pin head 70A downwards and compressing first spring 76 (in a second resilient mode of operation of the drive transfer device) until such time as pin head 70A aligns with recess 64 whereupon first spring 76 can expand and push pin head 70A into recess 64, and this is in spite of fact that pin housing 74 is on plateau 32.

Thus even when the output element is manually moved to an intermediate position the actuator can still function properly and does not jam.

Figure 16:
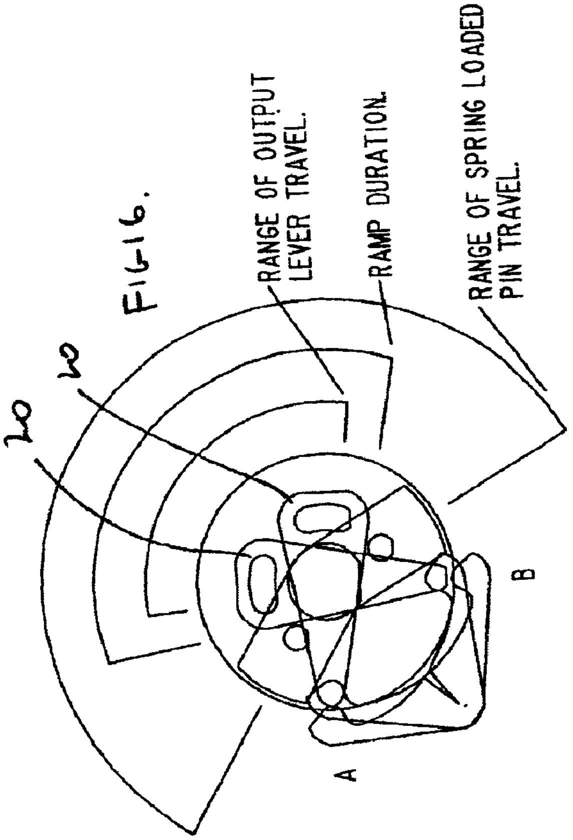
FIG. 16 shows the extent of movement of various components of the actuator of FIG. 1.

Considering of FIG. 16 shows the output element 20 in its extreme positions.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An actuator comprising:

a rotatable, reversibly drivable gear wheel rotatable about a gear axis between a first gear position and a second gear position;

an output element rotatable about the gear axis between a first output position and a second output position;

a drive transfer device that engages with and contacts the output element to operably connect the gear wheel to the output element such that the output element moves to the first output position when the gear wheel is driven to the first gear position and the output element moves to the second output position when the gear wheel is driven to the second gear position, and wherein the drive transfer device disengages from and is out of contact from the output element to operably disconnect the gear wheel from the output element to enable movement of the output element between the first and second output positions independently of the gear wheel.

2. The actuator as defined in claim 1 in which the drive transfer device engages with the output element and disengages from the output element in at least one predetermined position of the gear wheel.

3. The actuator as defined in claim 1 in which the drive transfer device moves non-radially relative to the gear wheel to engage with and disengage from the output element.

4. The actuator as defined in claim 3 in which the drive transfer device moves substantially parallel to the axis of rotation of the gear wheel to engage with and disengage from the output element.

5. The actuator as defined in claim 1 in which when the gear wheel is driven in a forward direction, a first ramp causes engagement of the drive transfer device with the output element, and a second ramp causes disengagement of the drive transfer device from the output element.

6. The actuator as defined in claim 5 in which when the gear wheel is driven in a reverse direction, the second ramp causes disengagement of the drive transfer device from the output element and the first ramp causes disengagement of the drive transfer device from the output element.

7. The actuator as defined in claim 1 in which the drive transfer device operates in a first resilient mode during engagement with and disengagement from the output element.

8. The actuator as defined in claim 7 in which the drive transfer device is a pin resiliently biased in a first direction by a first resilient means, such that the first resilient means moves when the drive transfer device operates in the first resilient mode.

9. The actuator as defined in claim 1 in which the drive transfer device is re-engageable with the output element following independent movement of the output element.

10. The actuator as defined in claim 9 in which the drive transfer device operates in a second resilient mode during re-engagement with the output element.

11. The actuator as defined in claim 10 in which the drive transfer device is a pin resiliently biased in a first direction by a first resilient means and resiliently biased in a second direction by a second resilient means, such that the first and the second resilient means move when the drive transfer device operates in the second resilient mode.

12. The actuator as defined in claim 1 in which a stop device is mounted on a chassis of the actuator.

13. The actuator as defined in claim 1 in which the gear wheel is rotatable through at least 360°.

14. An actuator comprising:

a chassis;

a gear wheel that is rotatable relative to the chassis of the actuator and that is reversibly drivable, wherein the gear wheel is rotatable between a first gear position and a second gear position;

an output element movable between a first output position and a second output position;

a drive transfer device engages with and contacts the output element to operably connect the gear wheel to the output element, such that the output element moves to the first output position when the gear wheel is driven to the first gear position and the output element moves to the second output position when the gear wheel is driven to the second gear position, wherein the drive transfer device disengages from and is out of contact from the output element to operably disconnect the gear wheel from the output element to allow movement of the output element between the first and second output positions independently of the gear wheel; and a stop device that is movable by the output element between a first stop position corresponding with the first output position and a second stop position corresponding with the second output position, wherein the stop device operably moves between the gear wheel and chassis to conduct a motor stoppage by preventing further rotation of the motor in at least one of the first stop position and the second stop position.

15. The actuator as defined in claim 14 in which the stop device includes a forward stop to conduct the motor stoppage in a forward direction and a reverse stop to conduct the motor stoppage in a reverse direction.

16. The actuator as defined in claim 15 in which the forward stop is resiliently mounted relative to the reverse stop.

17. The actuator as defined in claim 14 in which the stop device does not limit movement of the output element.

18. The actuator as defined in claim 14 in which the stop device is mounted on a chassis of the actuator.

19. The actuator as defined in claim 14 in which the gear wheel is rotatable through at least 360°.

20. An actuator comprising:

a rotatable, reversibly drivable gear wheel;

an output element movable between a first position and a second position;

a drive transfer device that engages with and contacts the output element to operably connect the gear wheel to the output element; and a stop device that operates on forward and reverse gear wheel stops to conduct a motor stoppage in a forward and reverse direction, the stop device including a forward stop device stop resiliently moveable relative to a reverse stop device stop to allow the forward gear wheel stop to pass the reverse stop device stop and to allow the reverse gear wheel stop to pass the forward stop device stop.

21. The actuator as defined in claim 20 in which the forward stop device stop and reverse stop device stop are mounted on separate arms of the stop device.

22. The actuator as defined in claim 21 in which the forward stop device stop is resiliently moveable relative to the reverse stop device stop by changing of the angle between the separate arms of the stop device.

23. The actuator as defined in claim 20 in which the stop device is pivotally mounted.

24. The actuator as defined in claim 20 in which the stop device is mounted on a chassis of the actuator.

25. The actuator as defined in claim 20 in which the gear wheel is rotatable through at least 360 °.

* * * * *